Figure 9:
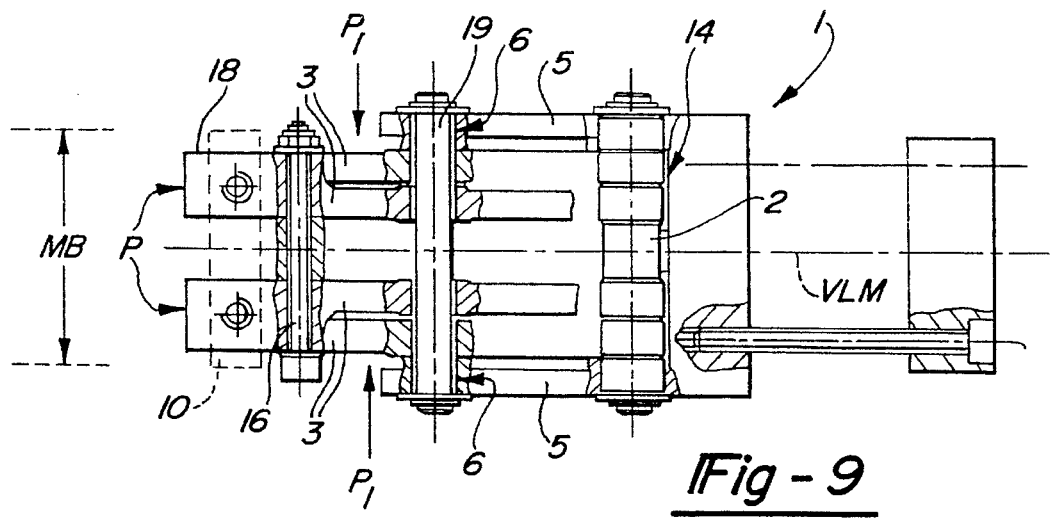

United States Patent [19]
Schauss et al.

[11] Patent Number: 5,503,378
[45] Date of Patent: Apr. 2, 1996

[54] CLAMPING CHUCK

[75] Inventors: Peter Schauss, Flörsheim; Michel Buchenau, Münster, both of Germany

[73] Assignee: Delaware Capital Formation, Inc., Wilmington, Del.

[21] Appl. No.: 144,143

[22] Filed: Oct. 27, 1993

[51] Int. Cl.[6] .................................................. B23Q 3/08
[52] U.S. Cl. ................................. 269/32; 269/34
[58] Field of Search .................. 269/32, 228, 27, 269/237, 238, 88, 34

[56]  References Cited

U.S. PATENT DOCUMENTS

| | | | |
|---|---|---|---|
| 3,570,835 | 10/1968 | McPherson | 269/32 |
| 5,064,177 | 11/1991 | Witt et al. | 269/32 |
| 5,118,088 | 6/1992 | Sowden | 269/32 |

*Primary Examiner*—Robert C. Watson
*Attorney, Agent, or Firm*—Dinnin & Dunn

[57] ABSTRACT

The invention pertains to a clamping chuck consisting of a fork-like clamp jaw holder (1) to which an adjusting element (2) moving back and forth in the longitudinal extension of the clamp jaw holder (1) is provided for the relative movement of the clamp jaw supports (3, 4) with respect to each other in the clamped and open setting. According to the invention, in each leg (5) of the clamp jaw holder (1) one bearing hole (6) and four additional holes (7, 7') are mutually aligned laterally, with their centers (Z) positioned on the corners (E) of the square (Q). The two bearing holes (6) are arranged centrally on the respective connecting line (L) of the two holes (7') on the clamp jaw side and the two clamp jaw supports (3, 4) provided on the clamp jaw holder (1) have a drilled hole (6') aligned with the bearing hole (6). In this case the moving or pivoting clamp jaw support (3) has features (8) for a frictional and/or form-fit actuated connection with the adjusting element (2). In this case the clamp jaw support can be oriented in different directions on the clamp jaw holder (1), without having to change it, and also differently configured clamp jaw supports can be provided on the clamp jaw holder (1).

10 Claims, 4 Drawing Sheets

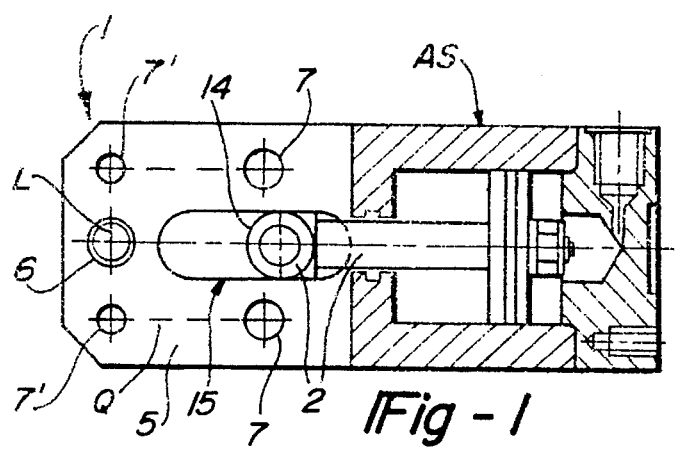
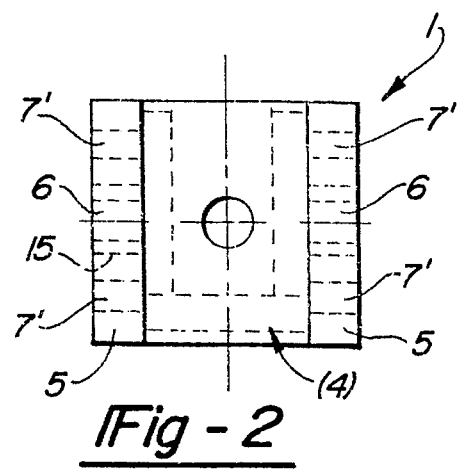
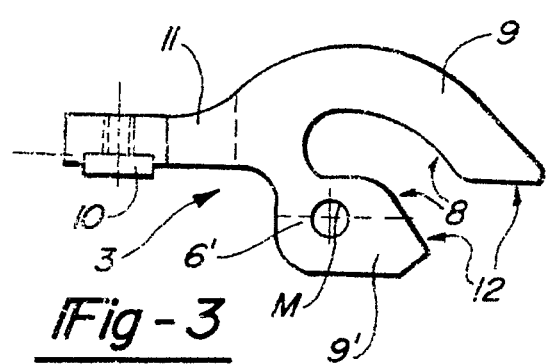
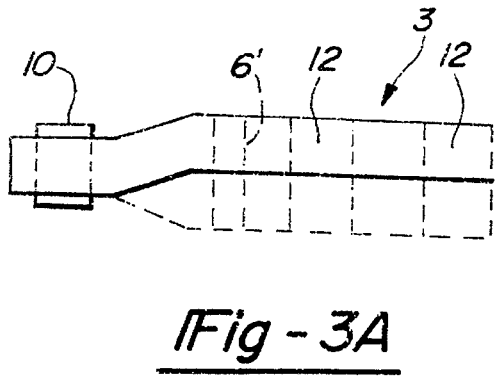
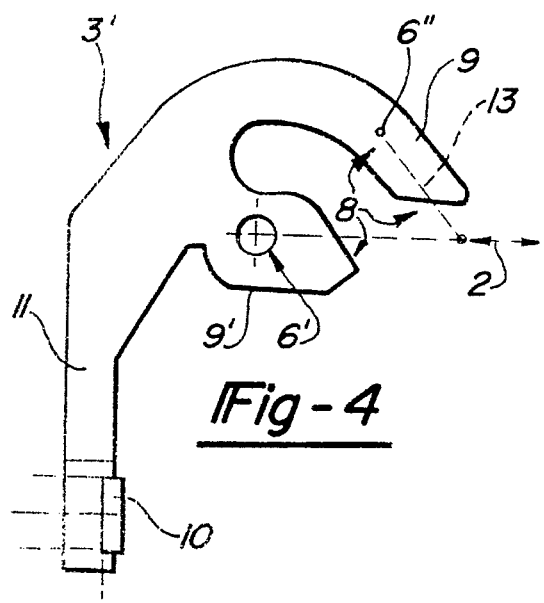
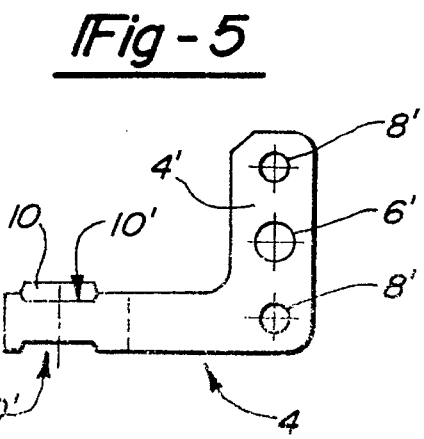

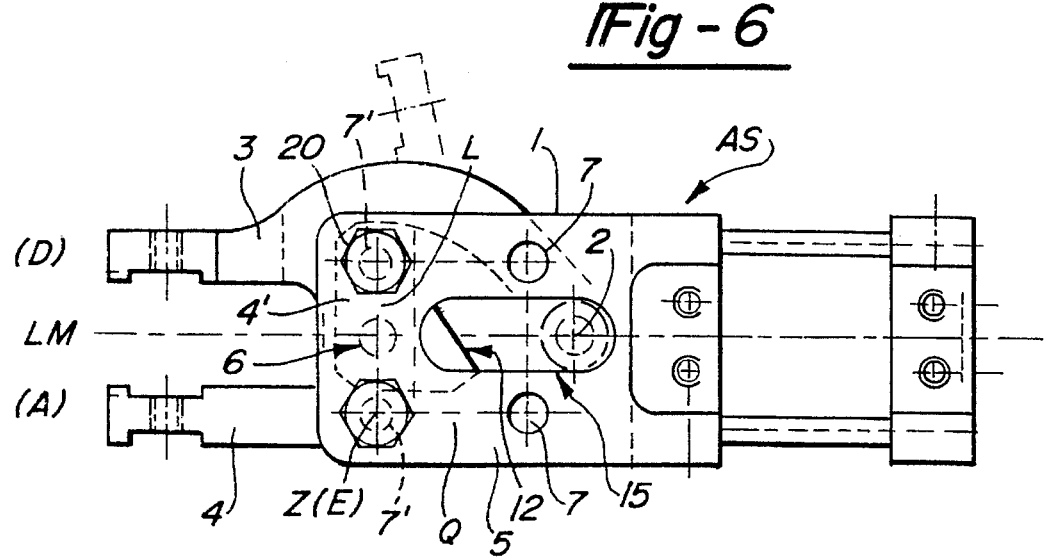
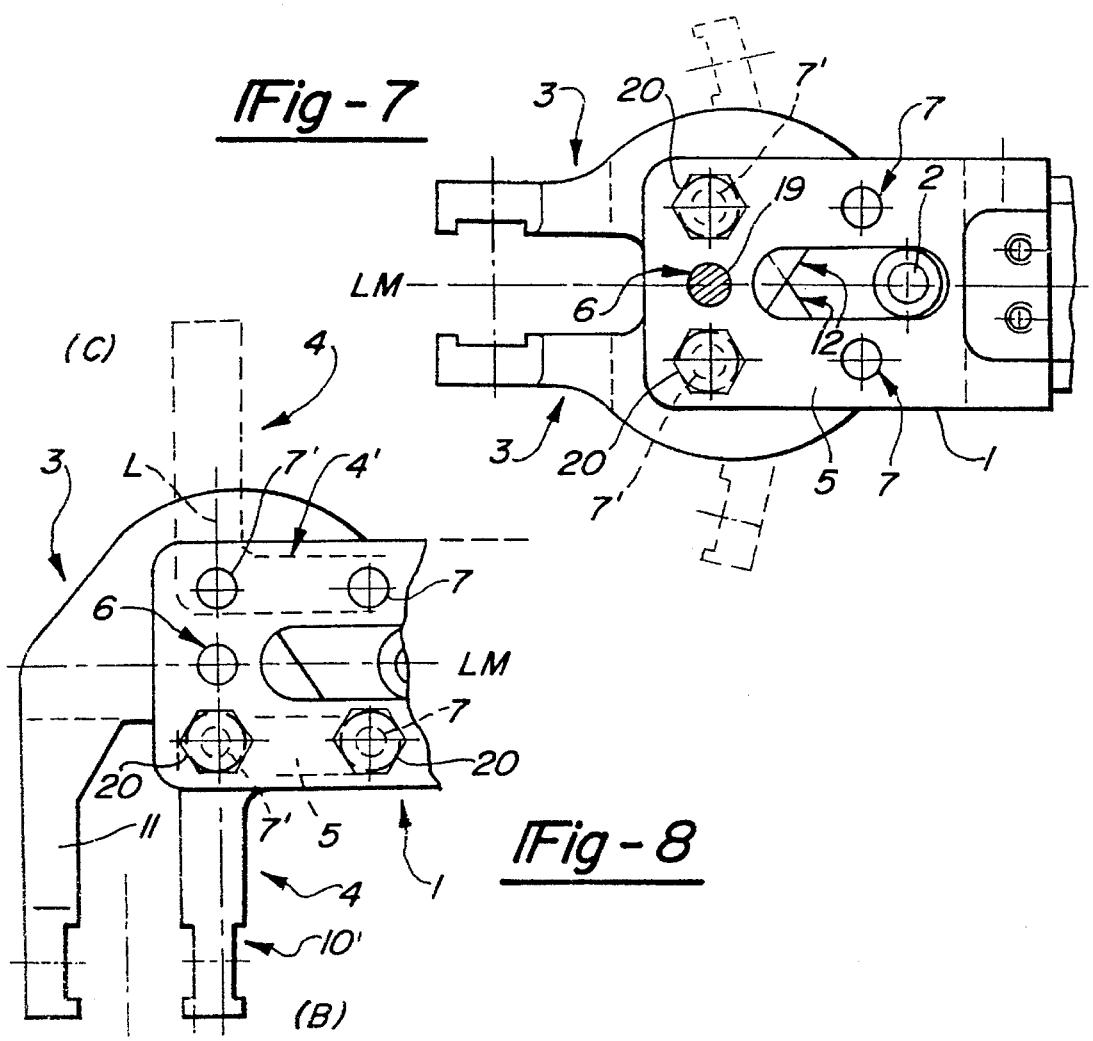

CLAMPING CHUCK

The invention pertains to a clamping chuck consisting of a fork-like clamp jaw holder to which an adjusting element moving back and forth in the longitudinal extension of the clamp jaw holder is provided for the relative movement of the clamp jaw supports with respect to each other in the clamped and open setting.

Clamping chucks of this type are known for example according to U.S. Pat. No. 3,630,391. With regard to pertinent devices of this type the reader is also referred to DE-GM 8,707,773 and EP-OS 0,125,819. Clamping chucks of this type are also called clamp levers and are used in particular to hold in place, in a detachable but secure manner, sheet metal or other parts in presses, shaping, welding and punching machines, holding which takes place between the two clamping jaws, of which the moving one as a rule is equipped with mounting tips, whereas the other one securely attached with the device actuator mount is attached in a suitable manner to a support belonging to the manipulation area. The actuator devices used for mechanisms of this kind as a rule pertain to servocylinders whose piston rod forming the adjusting element is coupled to the free end in a suitable manner with the moving clamping jaw or can be actuated with it (see U.S. Pat. No. 3,630,391 or EP-OS 0,125,819).

In the device according to U.S. Pat. No. 3,630,391 in this case the two clamp jaw supports that are provided in a scissors-like configuration on the clamp jaw holder, have only a frictional attachment to the adjusting element and in the design according to EP-OS 0,125,819 they are form-fitted by means of intervening elements.

For the devices to be installed usually in greater numbers in the systems mentioned above, it is desirable for example with regard to differently oriented installation settings, to be able to take into account differing access directions for the clamp jaws but also differently placed operating power feed lines for the actuation elements of various devices, and to be able to take account of these differing installation requirements. With the known devices mentioned above, this will not be directly possible, i.e. the manufacturer would be practically compelled to design and manufacture these devices while retaining their fundamental design principle and adapted to the particular installation requirements, in order for example, to be able to offer devices that can grasp upward or downward with respect to the clamp jaw holder, but also straight forward or that operate for example with a fixed jaw and one moving clamping jaw, whereby in this case again it may be necessary that the fixed jaw is to point upward, downward or forward with corresponding assignment of the moving clamp jaw.

Designs that are very complicated and that take up a lot of space are represented by clamping chucks according to GB 1,237,749 and 1,282,858; these designs pertain to "grasper hands" at the end of adjustable support rods, or on which the actual clamping chucks are adjustable as a whole. These devices (robot arms) cannot be used however in constricted space conditions.

The invention proceeds from clamping chucks of this generic type and is based on the problem of improving and designing the clamping chuck of the type described above, in such a manner that the clamp jaws can be oriented in differing directions on the clamp jaw holder, without having to change it, and also the differently configured clamp jaws can be used on the clamp jaw holder.

This problem is solved by a clamping chuck of the type described above according to the invention by the properties presented in the characterizing portion of claim 1. Favorable configurations, in particular as regards the clamp jaws themselves, are presented in the subclaims.

Due to this invented configuration of the clamping chuck, an exceptional variation range is obtained with regard to the allocation of the clamp jaw supports to the clamp jaw holder, connected with the advantage for the manufacturer that—without having to change the clamp jaw holder itself—similar or differently configured clamp jaw supports can be used; that clamp jaw support pairs can be provided of which one acts as fixed jaw support and the other acts as moving jaw support, whereby in the latter case in addition the possibility exists of providing the fixed clamp jaw on all three free sides of the clamp jaw holder by an appropriate shape adaptation of the moving jaw support. To do this we do not need a number of differently configured clamp jaw supports, but rather we can make do practically with only three types of clamp jaw supports, as will be explained in detail below.

Proceeding from this, the one clamp jaw support is designed as a fixed clamp jaw in the form of an angle piece and the hole aligned with the bearing hole is provided in its mounting leg and on both sides, next to this hole, the bolt leads are provided in the form of holes whose spacing corresponds to the spacing of the drilled holes in the clamp jaw holder. Thus this fixed clamp jaw can be positioned in four differing positions based on the drilling or hole pattern used on the clamp jaw holder.

In order to be able to place the moving clamp jaw support both with a corresponding fixed jaw support but also paired with the clamp jaw holder, the movable clamp jaw support is designed in the form of a fork with the protrusion bearing the clamp jaw, where the features for frictional or form-fit actuation with the adjusting element are designed in the form of ends of the fork leg as adjusting element stop surfaces and the hole aligned with the bearing hole of the mount is located in one leg. In a placement of the fixed jaw support across the longitudinal mid-line of the clamp jaw holder running through the middle bearing hole, the only thing to change about the moving clamp jaw holder is that the protrusion bearing the clamp jaw is parallel or inclined to the connecting line of the two holes on the clamp jaw side, and of course is oriented parallel or inclined in the sense that the protrusion is oriented in the direction of the fixed jaw support.

The range of variation with respect to the allocation of the clamp jaws to the clamp jaw holder is moreover not limited to a single frictional connection between clamp jaw support(s) and adjusting element, but rather can also be achieved when a form-fitted connection is used. In this case the moving clamp jaw support is designed in the form of a fork with protrusion bearing the clamp jaw; its legs bound the open and circular bolt leads at the end of the adjusting element, whereby the hole aligned with the bearing hole of the mount is provided in one leg and the other leg is connected to the end of the adjusting element by a spacer. Basically, the design of the moving clamp jaw support described above can be retained here, that is, a hole is provided only in one leg of the fork in order to be able to articulate the needed spacer in a suitable manner there.

The clamping chuck according to this invention will be explained in greater detail below based on the figures and illustration of sample designs.

Figure 10:
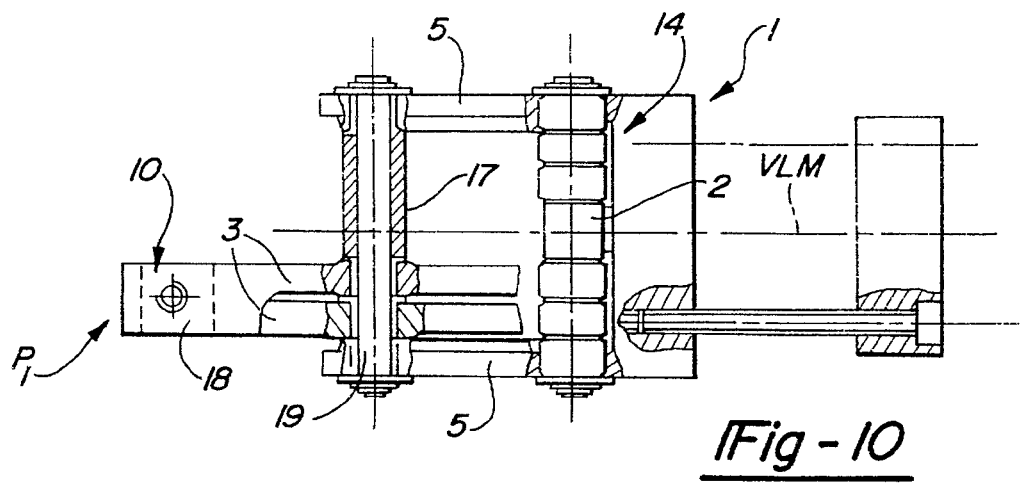

We have:

FIG. 1 A side view of the clamp jaw holder without clamp jaw support with a cut-away drawing of the drive unit in the form of a pneumatic cylinder FIGS. 2 and 4 A front view of the clamp jaw holder FIGS. 3, 3A and 5 Various sample designs of clamp jaw supports, where FIG. 3A shows one view of the clamp jaw support seen from above FIGS. 6–8 A side view of the device with differing and with differently oriented pairs of clamp jaw supports, and FIGS. 9, 10 A top view and partial cut-away of special and preferred designs of the device.

Figure 11:
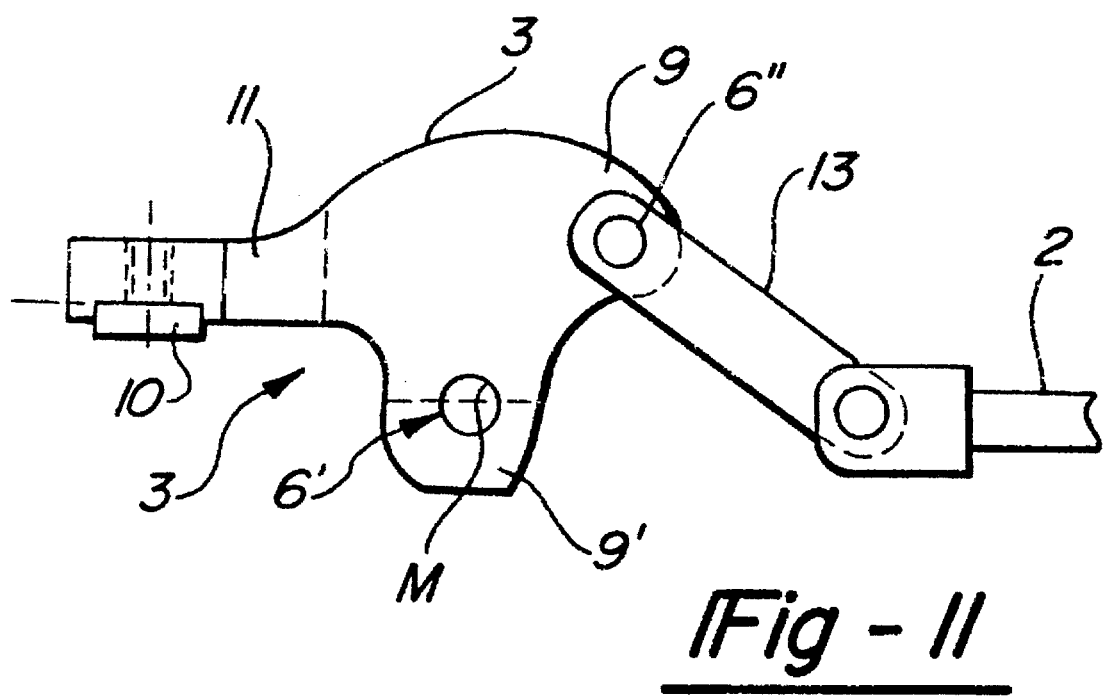

FIG. 11 is a side view of an alternative embodiment of the clamp chuck according to the present invention with portions removed for clarity.

The clamping chuck consists essentially of a fork-shaped clamp jaw holder 1 to which an adjusting element 2 moving back and forth in the longitudinal extension of the clamp jaw holder 1 is provided for the relative movement of the clamp jaw supports 3, 4 with respect to one other in the clamped and open setting.

For this device and for all designs to be described below it is essential that in the legs 5 of the clamp jaw holder 1 one bearing hole 6 and four additional holes 7 each are aligned laterally, with their centers Z positioned on the corners E of the square Q and the two bearing holes 6 are arranged centrally on the particular connecting line L of the two holes 7' on the clamp-jaw side and that the two clamp jaw supports 3, 4 provided on the clamp jaw holder 1 have a drilled hole 6' aligned with the bearing hole 6 and that at least the one moving clamp jaw support 3 has features 8 for a frictional or form-fit actuated connection with the adjusting element 2.

Pairs of clamp jaw supports composed of a fixed jaw and a moving clamp jaw are presented in FIGS. 6 and 8, where the possible positioning of the fixed mounted clamp jaw support 4 is indicated by dashed lines; [the support] according to FIG. 5 is designed in the form of an angled piece in whose attachment leg 4' the hole 6' aligned with the bearing hole 6 is provided and is located on both sides next to these holes 8', the mutual spacing of which corresponds to the spacing of the holes 6, 7' in the clamp jaw holder 1. In consideration of the different arrangement possibilities (A–D) of clamp jaw support 4, the latter, as illustrated, is provided on both sides with recesses 10' for clamp jaw inserts.

The side of the overall device with the connections for operating power is denoted as AS. Proceeding from that a total of four possible configurations A–D are obtained, due to the configuration of the perforation pattern and the design of the clamp jaw support 4. In the design according to FIG. 6, the clamp jaw support 3 according to FIGS. 3, 3A is associated with the clamp jaw support 4 which, as is visible there, is designed in the form of a fork with protrusion 11 bearing the clamp jaw 10, where the features 8 are designed as ends of the fork legs 9' in the form of adjusting element stop surfaces 12 and the hole 6' aligned with the bearing hole 6 of the holder 1 is provided in the leg 9'. This clamp jaw support 3 is seated on a transverse bolt 19 sitting in the bearing hole 6—regardless of whether the clamp jaw support 4 is in position A or D. The attachment leg 4' of the clamp jaw support 4 is in this case in the way, since it has a hole 6' aligned with and correspondingly sized for the bearing hole 6. A clamp jaw support 4 of this kind can also be positioned in positions B, C according to FIG. 8 on the clamp jaw holder 1, without having to be changed. But in this case the clamp jaw support 3 according to FIG. 3 must have a somewhat different shape in the sense of FIG. 4, that is, the protrusion 11 bearing the clamp jaw 10 is positioned parallel to the connecting line L of the two holes 7' on the clamp jaw side. In the positions B, C of the clamp jaw support 4, the holes 7, 7' are used to fix it in place, while in positions A (D) two holes 7' are used. Since the configuration in FIG. 8 uses bearing hole 6 on the clamp jaw holder 1 that remains open per se, the hole 6' in leg 4' of the clamp jaw support 4 will necessarily loose its significance here.

Likewise without having to change anything about the clamp jaw holder 1 and by the use of two clamp jaw supports 3 according to FIG. 3 as described above, the device can be equipped also according to FIGS. 7 and 3A with two clamp jaw supports 3 moving with respect with each other. Except for a special design of the device to be further described below, the clamp jaw supports 3 (this applies also to the fixed jaw support 4) are bent toward the vertical longitudinal middle plane VLM as evident in FIG. 3A.

In the sample designs of the device illustrated in FIGS. 6–8 the adjustment of the moveable seated clamp jaw support 3 is effected by running preferably the end of the adjusting element 2 provided with small rollers 14 toward the stop surface 12. Contact of the roller 14 with the heavily inclined stop surface 12 on the leg 9' causes opening [of the respective clamp jaw support 3], and upon withdrawal of the only slightly inclined stop surface 12 on the leg 9, the respective clamp jaw support 3 is brought into the closed or clamped setting.

But it is also possible to use a frictional and form-fit connection between clamp jaw supports 3 and adjusting element 2 by means of a spacer element 13 indicated by dashed lines in FIG. 4. But in this case the action directions of the drive units for the adjusting element 2 are reversed. The end of the adjusting element 2 moreover is expediently run in a known manner along the middle longitudinal line LM into slits 15 into the legs 5 of the clamp jaw holder 1, whereupon the transverse axis for the small rollers 14 is extended on both sides accordingly and their ends could be provided with correspondingly smaller guide rollers.

One design of the device according to FIGS. 9, 10 is preferred, whereby the jaw width MB of the clamp jaw holder 1, as evident, is sized much wider so that pairs of clamp jaws P can be provided on top and bottom. In this case, designs are presented with clamp jaw supports 3 seated pivoting on a transverse bolt 19 on top and bottom, that is, a total of four clamp jaw supports 3 are present, the design of which corresponds in principle to the design presented in FIG. 3. The clamp jaw supports 3 of one pair P positioned parallel to each other are in this case also connected to the transverse link by the particular clamp jaw 10 by means of a transverse bolt 16, as illustrated.

Furthermore in this design, a total of six rollers 14 is provided on the adjusting element 2, so that the respective outer roller is run in the slit 15 of the holder 1, the middle one acts on the stop surfaces 12 of the lower clamp jaw support 3 and the inner one acts on the upper clamp jaw support 3. In this case fixed clamp jaw supports 3 are not bent on the side, but rather are designed like a hammer head, as illustrated. Except for the symmetry to the vertical longitudinal middle plane VLM the actual clamp jaws 10 can be sized appropriately wide in this case. In addition this provides an additional possible variation, namely in that if only a relatively tight potential access is possible for sheet metal to be grasped, a pair $P_1$ of clamp jaw supports can be provided on only one side of the holder 1, as indicated in FIG. 10, where instead of the other pair $P_2$, a spacer casing 17 is provided on the transverse bolt 19. The other variant with held clamp jaw supports 4 described above is of course also possible in this case. In addition, the drilled holes 8' are formed on the fixed clamp jaw supports 4 according to FIG. 5 as threaded holes, so that these fixed jaw supports 4 can be held in place with screws 20 inserted from the outside through the holes 7, 7' to the inside on the legs 5 of the holder 1, as is evident from FIG. 2. The screws 20 have a length in this case that is sized so that they do not protrude inside over the fixed jaw support 4.

We claim:

1. Clamping chuck consisting of a fork-shaped clamp jaw holder (1) to which an adjusting element (2) moving back and forth in the longitudinal extension of the clamp jaw holder (1) is provided for the relative movement of the clamp jaw supports (3, 4) with respect to each other in the clamped and open position, characterized in that in each leg (5) of the clamp jaw holder (1) one bearing hole (6) and four additional holes (7, 7') are mutually aligned laterally, with their centers (Z) positioned on the corners (E) of the square (Q) and the two bearing holes (6) are arranged centrally on the respective connecting line (L) of the two holes (7') on the clamp jaw side and that the two clamp jaw supports (3, 4) provided on the clamp jaw holder (1) have a hole (6') aligned with the bearing hole (6) said hole providing a variety of directions in which the clamp jaw supports (3, 4) may be orientated and that at least the one clamp jaw support (3) engages the adjusting element (2).

2. A device according to claim 1, characterized in that one clamp jaw support (4) is designed as a fixed clamp jaw in the form of an angled piece including an attachment leg (4') having the hole (6') therein, said hole (6') aligned with the bearing hole (6) and on each side next to said bearing hole (6) are provided holes (8'), whose spacing corresponds to the spacing of the holes (6, 7') in the clamp jaw holder (1) and that the clamp jaw support is provided on both sides with recesses (10') for clamp jaw inserts.

3. A device according to claim 1 or 2, characterized in that the moving clamp jaw support (3) is designed in the form of a fork with a protrusion (11) bearing a clamp jaw (10), where the ends (8) are designed as ends of the fork legs (9, 9') in the form of adjusting element stop surfaces (12) and the hole (6') is aligned with the bearing hole (6) of the holder (1) provided in the leg (9').

4. A device according to claim 3, characterized in that the protrusion (11) bearing the clamp jaw (10) is positioned parallel to the connecting line (L) of the two holes (7') on the side of the clamp jaw.

5. A device according to claim 1 or 2, characterized in that the moving clamp jaw support (3) is designed in the form of a fork with a protrusion (11) bearing a clamp jaw (10), where the hole (6') aligned with the bearing hole (6) of the holder (1) is located in one fork leg (9') and in the other fork leg (9), a drilled hole (6") is provided to which is articulated an intermediate element (13) connected to the end of the adjusting element (2).

6. A device according to claim 1, characterized in that the clamp jaw supports (3, 3'; 4) are arranged top and bottom in pairs in a clamp jaw holder (1) having a corresponding jaw width (MB), where each pair is connected laterally by at least the particular clamping jaw (10).

7. A device according to claim 6, characterized in that the pivoting clamp jaw supports (3, 3') are connected by a transverse bolt (16).

8. A device according to claim 6, characterized in that in correspondingly sized clamp jaw holders (1), instead of the pairs on one side, a replaceable spacer casing (17) is provided.

9. A device according to one of claims 6 to 8, characterized in that the clamp jaw supports (3, 3') are designed like hammer-heads at their ends (18) bearing the clamp jaws (10).

10. A device according to claim 3 characterized in that the protrusion (11) bearing the clamp jaw (10) is positioned at a slope to the connecting line (L) of the two holes (7') on the side of the clamp jaw.

* * * * *